(12) United States Patent
Lu et al.

(10) Patent No.: US 9,362,566 B2
(45) Date of Patent: Jun. 7, 2016

(54) POSITIVE COMPOSITE MATERIAL FOR LITHIUM ION BATTERIES AND PREPARATION METHOD THEREOF

(75) Inventors: Shigang Lu, Beijing (CN); Surong Kan, Beijing (CN); Xiangjun Zhang, Beijing (CN); Weihua Jin, Beijing (CN)

(73) Assignee: GENERAL RESEARCH INSTITUTE FOR NONFERROUS METALS, Beijing (CN)

( * ) Notice: Subject to any disclaimer, the term of this patent is extended or adjusted under 35 U.S.C. 154(b) by 179 days.

(21) Appl. No.: 14/361,328

(22) PCT Filed: Dec. 20, 2011

(86) PCT No.: PCT/CN2011/084266
§ 371 (c)(1),
(2), (4) Date: May 29, 2014

(87) PCT Pub. No.: WO2013/078737
PCT Pub. Date: Jun. 6, 2013

(65) Prior Publication Data
US 2014/0346410 A1 Nov. 27, 2014

(30) Foreign Application Priority Data
Nov. 30, 2011 (CN) .......................... 2011 1 0391205

(51) Int. Cl.
*H01M 4/36* (2006.01)
*H01M 4/48* (2010.01)
(Continued)

(52) U.S. Cl.
CPC .............. *H01M 4/624* (2013.01); *H01M 4/136* (2013.01); *H01M 4/1397* (2013.01); *H01M 4/36* (2013.01);
(Continued)

(58) Field of Classification Search
CPC ....... H01M 4/06; H01M 4/362; H01M 4/386; H01M 4/405; H01M 4/48
USPC .......................................... 429/218.1, 231.95
See application file for complete search history.

(56) References Cited

U.S. PATENT DOCUMENTS

| 5,631,106 A | 5/1997 | Dahn et al. |
| 5,824,280 A | 10/1998 | Dahn et al. |

(Continued)

FOREIGN PATENT DOCUMENTS

| CN | 101047244 A | 10/2007 |
| CN | 101964411 A | 2/2011 |
| CN | 103545516 A * | 1/2014 |

*Primary Examiner* — Khanh Tuan Nguyen
*Assistant Examiner* — Haidung Nguyen
(74) *Attorney, Agent, or Firm* — Birch, Stewart, Kolasch & Birch, LLP

(57) ABSTRACT

An anode composite material for lithium ion battery and a preparation method thereof. The composite material is a composite material formed by compounding at least one of SiCO, SiCNO, SiCN and SiBCN with $Li_aM_bPO_4$, wherein $0.95 \leq a \leq 1.1$, $0.95 \leq b \leq 1.1$, and M is at least one of Fe, Co, Ni and Mn. The content of at least one of SiCO, SiCNO, SiCN and SiBCN in the anode composite material is in a range of 1-20 wt % of the total weight of the composite material. The composite material formed by compounding at least one of SiCO, SiCNO, SiCN and SiBCN with $Li_aM_bPO_4$ is obtained by adding $Li_aM_bPO_4$ into at least one organosilicon polymer of polysiloxane, polysilazane, and polyborosilazane, and then curing, crosslinking, and pyrolyzing. Compared with $Li_aM_bPO_4$, the composite material has a notable improvement in electrochemistry performance and tap density.

37 Claims, 7 Drawing Sheets

(51) Int. Cl.
 *H01M 4/62* (2006.01)
 *H01M 4/40* (2006.01)
 *H01M 4/136* (2010.01)
 *H01M 4/1397* (2010.01)
 *H01M 4/58* (2010.01)
 *H01M 4/38* (2006.01)

(52) U.S. Cl.
 CPC .............. *H01M 4/362* (2013.01); *H01M 4/364* (2013.01); *H01M 4/405* (2013.01); *H01M 4/48* (2013.01); *H01M 4/5825* (2013.01); *H01M 4/622* (2013.01); *H01M 4/625* (2013.01); *H01M 4/386* (2013.01); *Y02E 60/122* (2013.01); *Y02P 70/54* (2015.11)

(56) References Cited

U.S. PATENT DOCUMENTS

| | | | |
|---|---|---|---|
| 8,870,975 B2* | 10/2014 | Green | H01M 4/0492 117/205 |
| 2007/0224509 A1 | 9/2007 | Aramata et al. | |
| 2010/0099029 A1* | 4/2010 | Kinoshita | H01M 4/134 429/316 |

* cited by examiner

POSITIVE COMPOSITE MATERIAL FOR LITHIUM ION BATTERIES AND PREPARATION METHOD THEREOF

FIELD OF INVENTION

The invention relates to a positive composite material for lithium ion batteries and a preparation method thereof, belongs to the field of a chemical power source, and particularly relates to a critical material and the technical field of lithium ion batteries.

BACKGROUND OF THE INVENTION

Since Sony Corporation in Japan develops lithium ion batteries in 1990, research and development of a positive material have attracted people's attention. The positive material used by the commercial lithium ion battery at present mainly is a lithium-inserted transition metal oxide, which comprises lithium cobalt oxide $LiCoO_2$ and lithium nickelate $LiNiO_2$ with a layer shape structure, lithium manganate $LiMn_2O_4$ with a spinel structure, and the like, wherein the most wide lithium cobalt oxide $LiCoO_2$ material has excellent electrochemical property, but the lithium cobalt oxide $LiCoO_2$ is short in resource, high in price, poor in safety and the like, so that large-scale application is limited especially in the field of a battery of an electric vehicle. The lithium nickelate $LiNiO_2$ is difficult to be synthesized, the safety of which is poor, so that the application and development are limited. The lithium manganate $LiMn_2O_4$ is low in synthetic cost, good in safety, but low in capacity, and poor in high-temperature cycle stability, so that the application is limited.

Olivine-type lithium iron phosphate has become a research hotspot of the positive material for lithium ion batteries due to its excellent safety performance. Goodenough and the like researched a series of transition metal polyanionic compounds $M_2(XO_4)_3$ (M=TIFeNbVX=SPAsMoW) in 1997, and found out that the olivine-type lithium iron phosphate has good lithium ion intercalation capacity and deintercalation capacity. The theoretical specific capacity can be up to 170 mAh/g; the olivine-type lithium iron phosphate has more stable cycle stability than the lithium cobalt oxide; the cyclic service life can be up to over 2,000 times; a discharge platform is stable, and about at 3.4V. In addition, the lithium iron phosphate is abundant in resource, and good in environmental compatibility, and has a broad application prospect in the industry of the lithium battery, but the lithium iron phosphate has low electronic conductivity, which just is $10^{-9}$ S/cm. Pure lithium iron phosphate just can discharge 40-60% of theoretical capacity in general in a manner of adding a conductive agent when an electrode is prepared, and the first charge-discharge efficiency and the cyclic capacity retention rate are low, so that the pure lithium iron phosphate is poor in practicability when being directly applied to the positive composite material for lithium ion batteries. Modification of the lithium iron phosphate material is a sole way to make the lithium iron phosphate practical. Doping and coating are two main modification methods.

The Canada Phostech Company applies for a patented technology for coating the positive material by carbon in Canada in 1999, the patent number is CA2270771; the corresponding general formula of the positive material is $A_aM_mZ_zO_oN_nF_f$, wherein A is alkali metal; M is at least one transition metal or at least one non-transition metal; Z is at least one non-metal such as O (oxygen), N (nitrogen) and F (fluorine). The positive is characterized in that carbon is deposited at the surface of $A_aM_mZ_zO_oN_nF_f$ and carbon is obtained by pyrolysis of organic substances. The patented technology displays that the electrochemical property of the lithium iron phosphate after being coated by the carbon is significantly improved in comparison with that of the uncoated lithium iron phosphate. The electrical conductivity between lithium iron phosphate particles can be improved by carbon coating, also the particle size of the lithium iron phosphate also can be reduced, so that the macro electrochemical property of lithium iron phosphate is improved. But the tap density is obviously reduced due to addition of coated amorphous carbon. The tap density of the commercial lithium iron phosphate at present is smaller than 1.1 $gcm^{-3}$ in general, and smaller than 1 $gcm^{-3}$ in most of the time. Thus, improvement of the property of the lithium iron phosphate and improvement of the tap density cannot be organically unified.

Coating of an oxide is a common method in the field of the electrode materials for lithium ion batteries, and mainly plays the roles of improving the material stability, avoiding direct contact with electrolyte, and improving the electrochemical property of the material, for example, in US20050130042A1, oxides such as oxides of Al, Mg, Zn, Sn, Si and B coated at the surface of the $LiCoO_2$, $LiNi_xCo_{1-x}O_2$, $LiNi_{1/3}Co_{1/3}Mn_{1/3}O_2$ and $LiMn_2O_4$.

The positive material in the US2007/0207385A1 comprises a main component $A_{3x}M1_{2y}(PO_4)_3$, the second part of components containing at least one of SiC, BN or $M2_{2a}O_b$; the second part is coated on the surface of the $A_{3x}M1_{2y}(PO_4)_3$; wherein A is at least one element of IA, IIA and IIIA; M1 and M2 are at least one element of IIA, IIIA, IVA and VA. The preparation method proposed by the embodiment of the patent comprises the following steps: firstly, preparing a solution containing an A ion, an M1 ion and $PO_4^{3-}$, or firstly preparing the $A_{3x}M1_{2y}(PO_4)_3$; adding a solution containing the M2 ion to adjust the PH value, so as to form an M2 hydroxide sediment; and converting into an M2 oxide, so as to obtain a composite product by thermal treatment.

The patented technology mainly comprises: the oxides, SiC and BN are coated on the surface of the positive material, wherein SiC is a semiconductor; the ion is low in conductive ability, and does not have electrochemical activity. The synthetic SiC is also high in temperature (greater than 1500° C.) in general, and it is difficult to be independently coated. The $SiO_2$ and BN belong to an insulator. Although the $SiO_2$ has certain ion conductive ability, the effect on modification of the properties of the lithium iron phosphate is very limited by independently using SiC, $SiO_2$, BN or any mixture thereof.

SUMMARY OF THE INVENTION

The invention is directed to provide a positive composite material for lithium ion batteries capable of significantly improving the electrochemical property and the tap density and a preparation method thereof.

In order to achieve above target, the invention adopts the technical solution as follows:

The positive composite material for lithium ion batteries disclosed by the invention is obtained by compounding $Li_aM_bPO_4$ and at least one of SiCO, SiCNO, SiCN and SiBCN, wherein $0.95 \le a \le 1.1$; $0.95 \le b \le 1.1$; M is at least one of Fe, Co, Ni and Mn; at least one of SiCO, SiCNO, SiCN and SiBCN accounts for 1-20 wt % of total weight of the composite material; the $Li_aM_bPO_4$ accounts for 80-99 wt % of total weight of the composite material.

SiCN or SiCNO is prepared by pyrolysis of polysiloxane, SiCN is prepared by pyrolysis of polysilazane, and SiBCN is prepared by pyrolysis of polyborosilazane.

The polysiloxane is a polymer wherein a repeated Si—O bond is taken as the main chain; silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, hydrogen, alkenyl and halogen; the polymerization degree of the polysiloxane is 2-2,000, and preferably is 5-500; wherein the quantity of carbon atoms in the alkoxy, the alkenoxy and the acyloxy is 1-6; the alkyl is alkyl, alkenyl, alkynyl, aryl and aralkyl, and the quantity of the carbon atoms of which is 1-12, and preferably is 1-8. The polysiloxane preferably is the polysiloxane containing the Si—H bond in the molecule; the polysiloxane preferably is the polysiloxane containing the Si—OH bond in the molecule; the polysiloxane preferably is the polysiloxane containing unsaturated hydrocarbon or an unsaturated hydrocarbon derivatives in the molecule; the polysiloxane preferably is the polysiloxane containing phenyl in the molecule; the polysiloxane preferably is the thermocuring silicon resin; the polysiloxane is liquid polysiloxane or the polysiloxane which can be dissolved with a solvent or can be fused.

The polysilazane is a polymer wherein a repeated Si—N bond is taken as the main chain; silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, hydrogen, alkenyl and halogen; the polymerization degree of the polysilazane is 2-2,000, and preferably is 5-500; wherein the quantity of carbon atoms in the alkoxy, the alkenoxy and the acyloxy is 1-6; the alkyl is alkyl, alkenyl, alkynyl, aryl and aralkyl, and the quantity of the carbon atoms is 1-12, and preferably is 1-8. The polysilazane preferably is the polysilazane containing the Si—H bond in the molecule; the polysilazane preferably is the polysilazane containing the Si—OH bond in the molecule; the polysilazane preferably is the polysilazane containing unsaturated hydrocarbon or an unsaturated hydrocarbon derivatives in the molecule; the polysilazane preferably is the polysilazane containing phenyl in the molecule; the polysilazane is liquid polysilazane or the polysilazane which can be dissolved with a solvent or can be fused.

The polyborosilazane is a polymer wherein a repeated —C—Si—N—B— or —B—C—Si—N— or —C—B—Si—N— is taken as the main chain; silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, alkoxy, alkenoxy, acyloxy, hydrogen and halogen; the polymerization degree of the polyborosilazane is 2-2,000, and is preferably 5-500; wherein the quantity of carbon atoms in the alkoxy, the alkenoxy and the acyloxy is 1-6; the alkyl is alkyl, alkenyl, alkynyl, aryl and aralkyl, and the quantity of the carbon atoms is 1-12, and preferably is 1-8. The polyborosilazane is liquid polyborosilazane or the polyborosilazane which can be dissolved with a solvent or can be fused.

The invention provides a positive composite material for lithium ion batteries, wherein preferably a=1, b=1 and M is at least one of Fe, Co, Ni and Mn in $Li_aM_bPO_4$.

A method for preparing the composite material, comprising the following steps:

(1) Dissolving at least one of the polysiloxane, the polysilazane and the polyborosilazane into an organic solvent, wherein the adding amount of the organic solvent is that according to the volume ratio of the added polymer to the solvent is 1:1 to 1:5, and the adding amount of at least one of the polysiloxane, the polysilazane and the polyborosilazane is calculated according to the pyrolysis rate under the same experiment condition, so that at least one of SiCO, SiCNO, SiCN and SiBCN in the pyrolyzed positive composite material accounts for 1-20 wt % of the total weight of the composite material; then adding $Li_aM_bPO_4$, wherein the adding amount of the $Li_aM_bPO_4$ is calculated according to the pyrolysis rate under the same experiment condition, so that the $Li_aM_bPO_4$ in the pyrolyzed positive composite material accounts for 80-99 wt % of the total weight of the composite material, and evenly agitating;

(2) Curing to form a crosslinked product;

(3) Sintering the crosslinked product in a non-oxidizing atmosphere or vacuum, so as to obtain the composite material wherein the $Li_aM_bPO_4$ is compounded with at least one of SiCO, SiCNO, SiCN and SiBCN.

The organic solvent is at least one of acetone, toluene, dimethylbenzene, ethanol, diethyl ether, normal propyl alcohol, isopropanol, n-butyl alcohol, acetonitrile, cholamine, tetrahydrofuran, dimethyl formamide (DMF), chloroform, pyridine and N-methylpyrrolidone.

The curing is at least one of heat curing, heat curing after adding a curing agent, and UV curing, wherein the curing temperature in the heat curing or the heat curing by adding the curing agent is 20-400° C.

The sintering condition is keeping warm at 300-500° C. for 0-5 hours, then heating to 500-850° C., and keeping warm for 1-15 hours.

The sintering condition preferably is keeping warm at 300-500° C. for 0-5 hours, then heating to 600-750° C., and keeping warm for 1-10 hours.

The non-oxidizing atmosphere is at least one of argon, nitrogen, $NH_3$ and $H_2$, or vacuum.

In the step (1), Carbon or a carbon precursor is added before $Li_aM_bPO_4$ after at least one of the polysiloxane, the polysilazane and the polyborosilazane is dissolved into the organic solvent, and the residual carbon after the carbon or the carbon precursor being carbonized accounts for 1-20 wt % of the total weight of the composite material.

The carbon or the carbon precursor is at least one of graphite, acetylene black, cane sugar, glucose, fructose and phenolic resin.

The $Li_aM_bPO_4$ is prepared from metal M powder and lithium dihydrogen phosphate by a solid-phase method.

The solid-phase method comprises the following steps: adding the metal M powder and the lithium dihydrogen phosphate according to a molecular expression of the $Li_aM_bPO_4$; adding a solvent to carry out wet grinding, wherein the adding amount of the solvent is according to the solid-liquid volume ratio of 1:1 to 1:5; adding deionized water after carrying out wet grinding until the particle size is smaller than 2 μm, wherein the adding volume of the deionized water is 5-50% of the volume of the slurry; drying to obtain a precursor; putting into a high-temperature furnace, heating to 300-500° C. in the non-oxidizing atmosphere or vacuum; keeping warm for 0-10 hours, then heating to 600-850° C., and keeping warm for 2-24 hours, naturally cooling, so as to obtain pure-phase $Li_aM_bPO_4$.

The solvent is one of ethanol, acetone, normal propyl alcohol, normal butanol, cholamine and isopropanol.

The deionized water is added by agitating while adding, and then ball-milling for 0.5-1 hour after the deionized water being added.

The drying way comprises one of vacuum drying and microwave drying.

The non-oxidizing atmosphere comprises at least one or a mixture of argon, nitrogen and $H_2$.

The M powder is the powder prepared by a reduction method, the powder prepared by an electrolytic process or the powder prepared by a carbonyl process, and the particle size of the M powder is 500 nm to 10 μm.

In the preparation method of the $Li_aM_bPO_4$, the tap density of the $Li_aM_bPO_4$ can be improved when the carbon or the carbon precursor is not added.

In the preparation method of the $Li_aM_bPO_4$, the role of adding deionized water is to quickly thicken the slurry; the uniformity of the slurry in the thickening process can be ensured by agitating when adding and ball-milling for 0.5-1 hour after adding, so as to the prepared $Li_aM_bPO_4$ material has good electrochemical property.

In the preparation process, the role of curing the polysiloxane, the polysilazane and the polyborosilazane is cross-linking and curing into a three-dimensional insoluble network structure, so as to improve the pyrolysis rate in the pyrolysis process; the curing preferably is addition reaction of a silicon hydrogen bond contained in a polymer molecule and an unsaturated bond contained in a curing agent, self-condensation reaction of hydroxyl in the polymer, self-polymerization reaction of the unsaturated bond in the polymer and thermocuring reaction of silicon resin. The functional groups in the polysiloxane, the polysilazane and the polyborosilazane mainly play the roles of benefiting for cross-linking and curing and improving the pyrolysis rate.

A material containing Si, C and O, and a material containing Si, C, N and O obtained from the polysiloxane by pyrolysis are collectively known as SiCO and SiCNO in the document; a material containing Si, C and N obtained from the polysilazane by pyrolysis is collectively known as SiCN; a material containing Si, B, C and N obtained from the polyborosilazane by pyrolysis is collectively known as SiBCN.

When the polymer contains more phenyls, alkenyls and alkynyls, the content of C in the composite product is higher, so that the electrochemical property of the composite material is better.

In the embodiment 11, the polysiloxane is dissolved into an organic solvent, and then $LiFePO_4$ is added, evenly agitated, heated and solidified, so as to a precursor is prepared. The material which is prepared from the precursor in the non-oxidizing atmosphere or vacuum by pyrolysis is subjected to test analysis of XRD, TEM, tap density, electrochemical specific capacity and the like. The XRD result is displayed as a $LiFePO_4$ structure (see FIG. 1), which shows that the main structure of the material is not changed. The TEM result displays that there is a coating layer on the surface of particles. Particles [see FIG. 3(1)] are selected to carry out energy spectrum analysis, and subjected to line scanning from the outer layer to the internal part of the particles (carrying out a line scanning from a to b). It can be seen that the content of Fe [see FIG. 3(2)] and P (see FIG. 3(3)) gradually ascends from the edge of the particles to the internal part of the particles along with the scanning position, for Fe and P are main elements of the $LiFePO_4$, it is shown that the $LiFePO_4$ is mainly distributed inside the particles; the content of Si [see FIG. 3(4)] gradually descends, which shows that Si is mainly distributed on the outer layers of the particles; for Si is a main element of a pyrolysis product of the polysiloxane, which shows that the main body $LiFePO_4$ is inside the particles, and the coated pyrolysis product of the polysiloxane is mainly distributed at the outer layers of the particles, so as to form the composite material. The electrochemical property and tap density test of the composite material displays that the electrochemical specific capacity and the tap density are significantly improved in comparison with the $LiFePO_4$ which is not compounded, and the target of synchronous improvement of the electrochemical property and tap density of the material is achieved after compounding. The reason is that:

The SiCO, the SiCNO, the SiCN and the SiBCN have network structure, wherein Si, C and O in the SiCO structure, Si, C, N and O in the SiCNO structure, Si, C and N in the SiCN structure, and Si, C, N and B in the SiBCN structure are connected by a chemical bond, so that have better electrical conductivity, stability and inoxidizability in comparison with SiC, $SiO_2$ and BN, and are compact; the tap density is about 2.2 $g/cm^3$ in general. Compared with the material coated independently with SiC, $SiO_2$ and BN, the composite material prepared by compounding the $Li_aM_bPO_4$ and at least one of SiCO, SiCNO, SiCN and SiBCN is significant in effect in the aspect of improvement of the capacity. Compared with the $Li_aM_bPO_4$ material which is coated independently by carbon material, the composite material disclosed by the invention is significant in effect in the aspect of improvement of the tap density. Improvement of the surface performance of the $Li_aM_bPO_4$ is facilitated by a net structure which is formed by the precursors SiCO, SiCNO, SiCN and SiBCN at an early stage in a cross-linking manner, and the electrical conductivity of the $Li_aM_bPO_4$ is improved. From the charge-discharge curve, the first charge-discharge curve of the compounded composite material becomes smooth, the platform becomes flat, and charge-discharge polarization is obviously reduced. From the electrochemical property, the first specific capacity and the first charge-discharge efficiency of the compositely modified $Li_aM_bPO_4$ is greatly improved, and the tap density is also significantly improved. The SiCO, the SiCNO, the SiCN and the SiBCN have stable characteristics in the air, so that the storage performance of the modified $Li_aM_bPO_4$ is greatly improved.

The $Li_aM_bPO_4$ in the technology of the invention is obtained from the metal powder and lithium dihydrogen phosphate in manners of wet-milling in the solvent and drying, and then sintering at high temperature in the non-oxidizing atmosphere or vacuum. The metal powder which is larger in density and lower in price is used, so that the $Li_aM_bPO_4$ synthetized by the method of the invention has the characteristics of being larger in tap density and lower in cost.

In addition, the material of the invention is greatly improved in the tap density in comparison with the material which is simply coated by carbon. The tap density of the carbon-coated lithium iron phosphate is smaller than 1.1 $g/cm^3$ in general. The tap density of the compounded $Li_aM_bPO_4$ of the invention is greater than 1.5 $g/cm^3$ in general, and also can be up to over 2.0 $g/cm^3$.

DETAILED DESCRIPTION OF THE INVENTION

Figure 1:
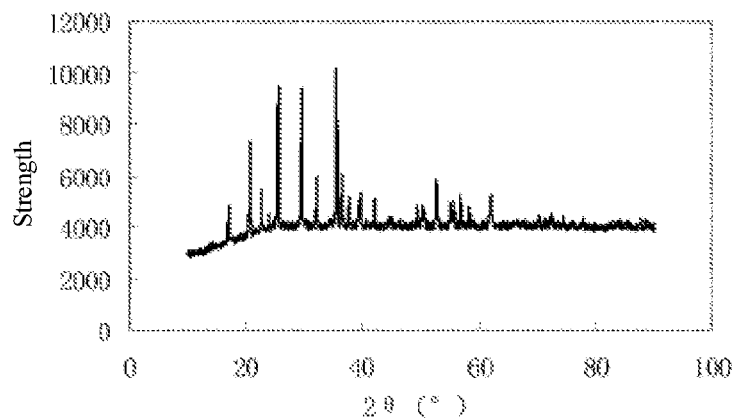
FIG. 1 is the XRD map of the compounded material in the embodiment 11.
Figure 2:
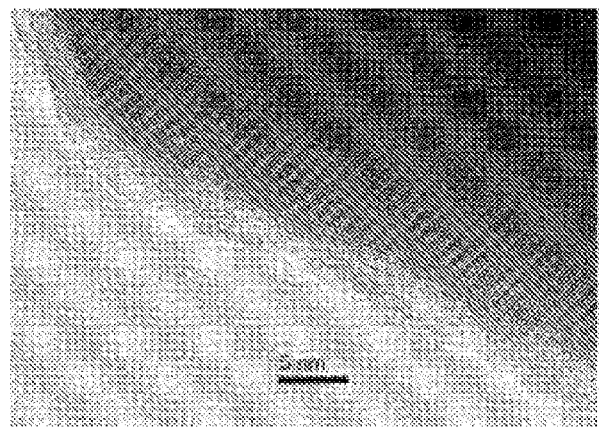
FIG. 2 is the TEM map of the compounded material in the embodiment 11.
Figure 3:
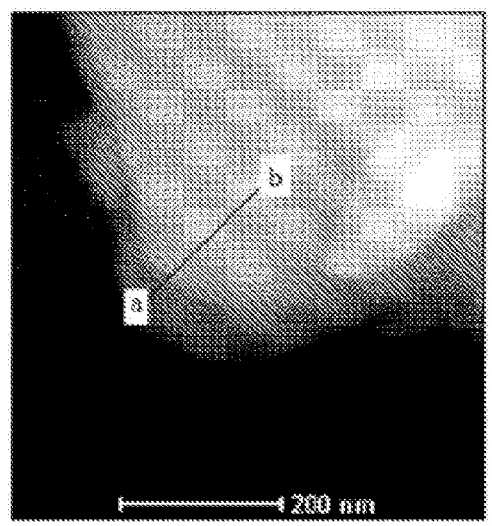
FIG. 3(1), 3(2), 3(3), and 3(4) are the energy spectrum of the compounded material in the embodiment 11.
Figure 3:
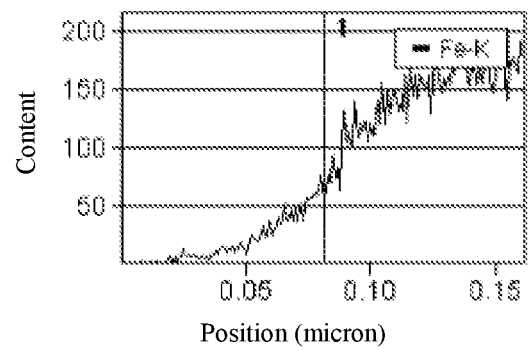
Figure 3:
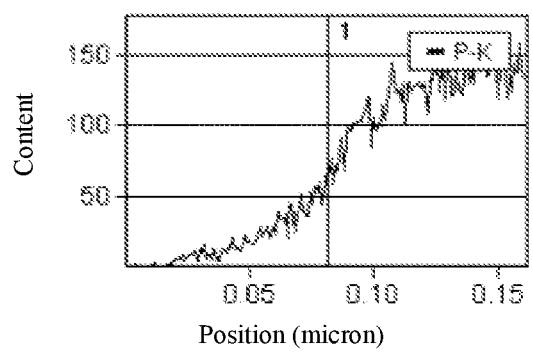
Figure 3:
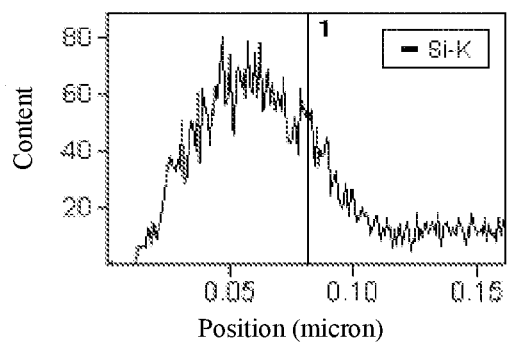
Figure 4:
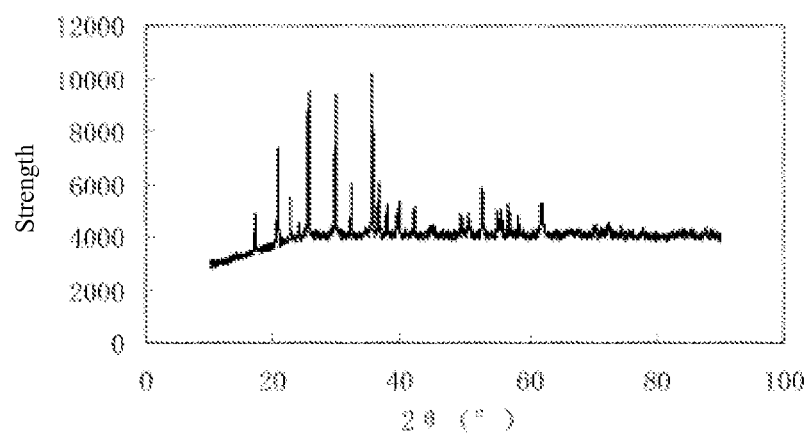
FIG. 4 is the XRD map of the $LiFePO_4$ synthetized in the contrast example 1.
Figure 5:
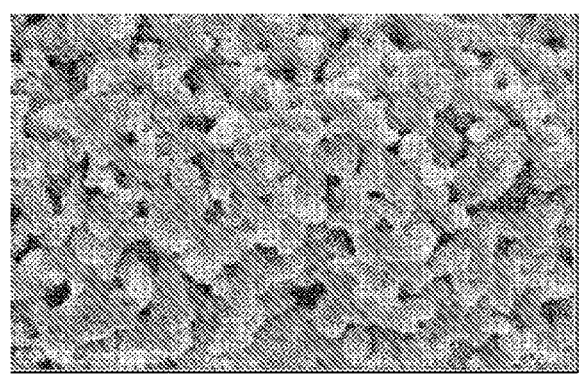
FIG. 5 is the SEM photograph of the $LiFePO_4$ synthetized in the contrast example 1.
Figure 6:
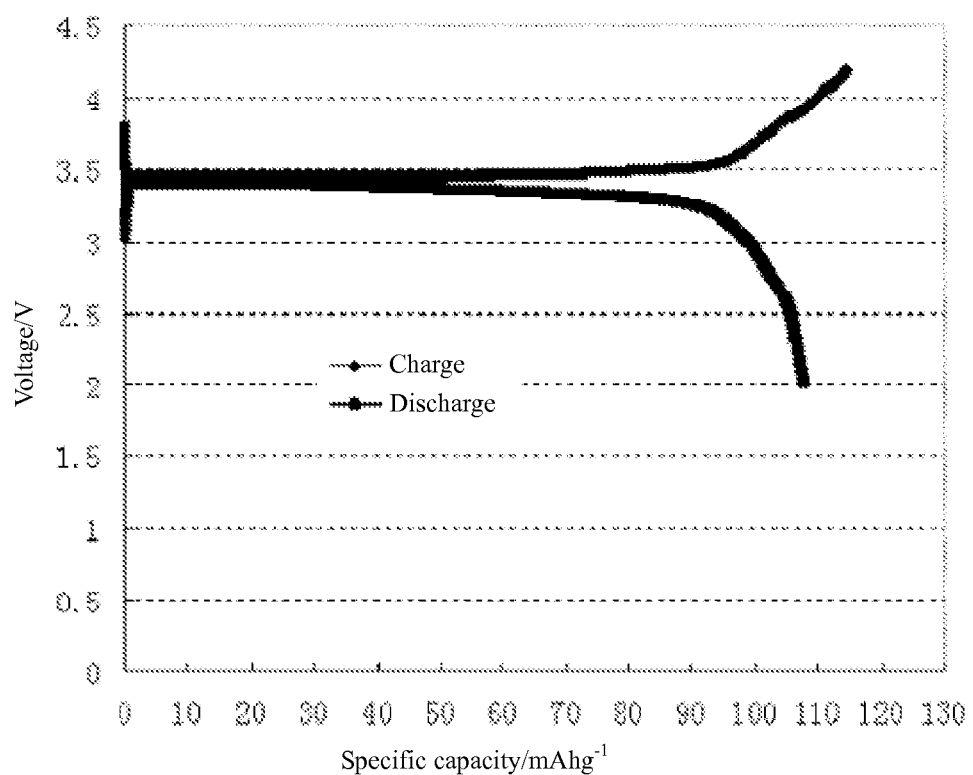
FIG. 6 is the first charge-discharge curve of the $LiFePO_4$ synthetized in the contrast example 1.
Figure 7:
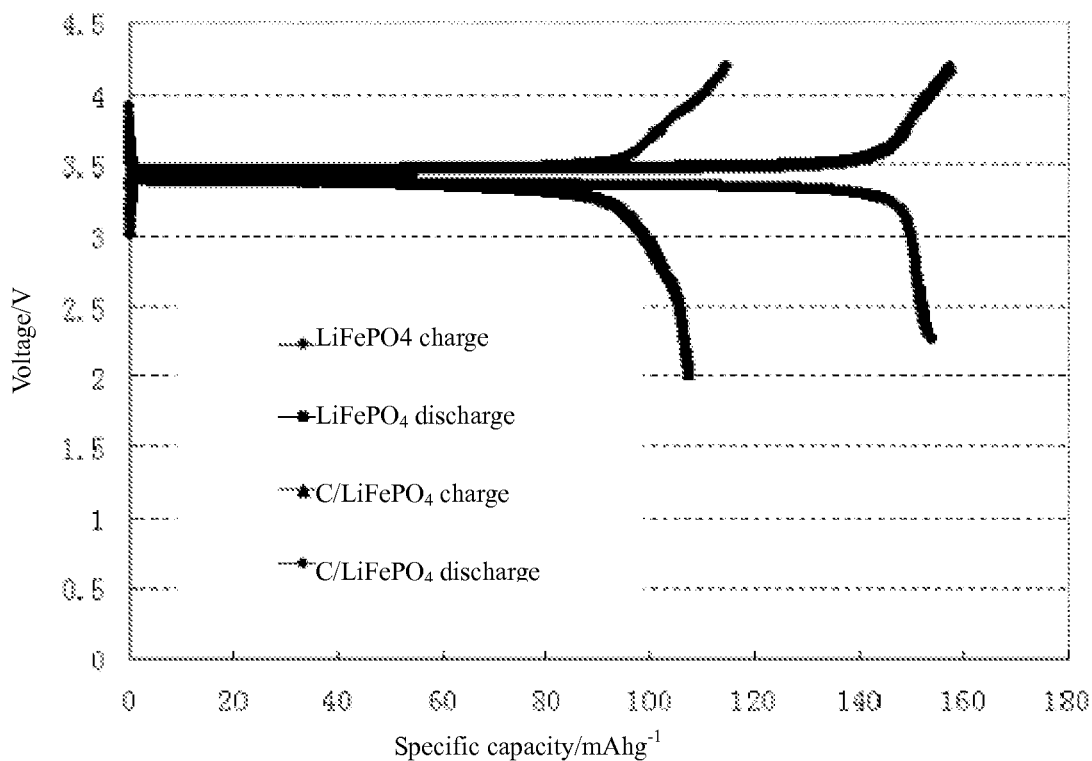
FIG. 7 is the first charge-discharge curve of the $C/LiFePO_4$ coated by cane sugar in the contrast example 3.
Figure 8:
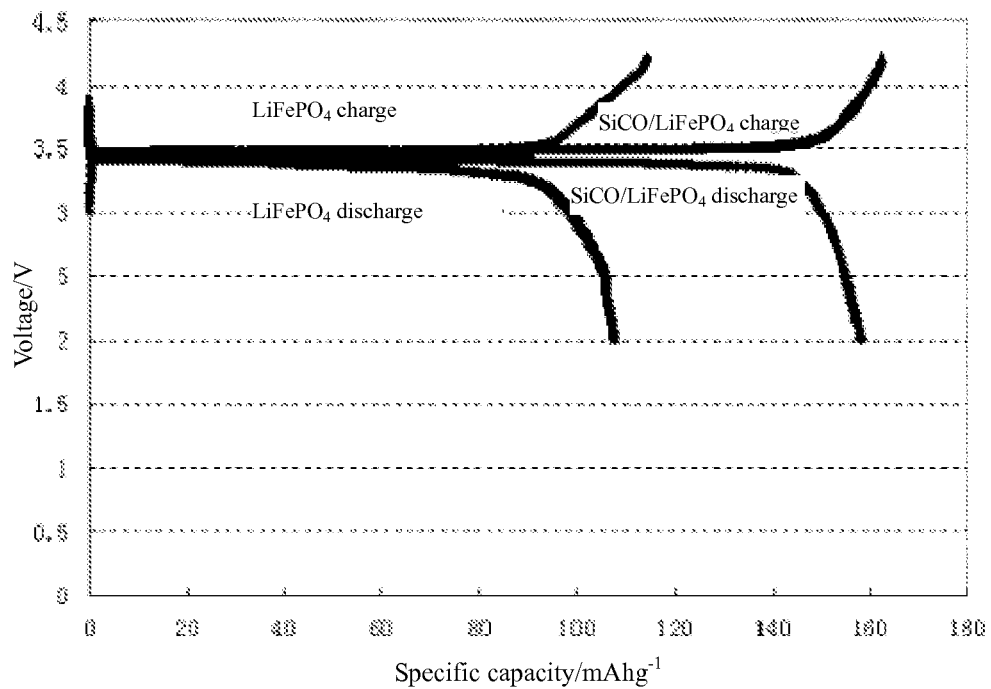
FIG. 8 is the first charge-discharge curve of the $SiCO/LiFePO_4$ in the embodiment 1.
Figure 9:
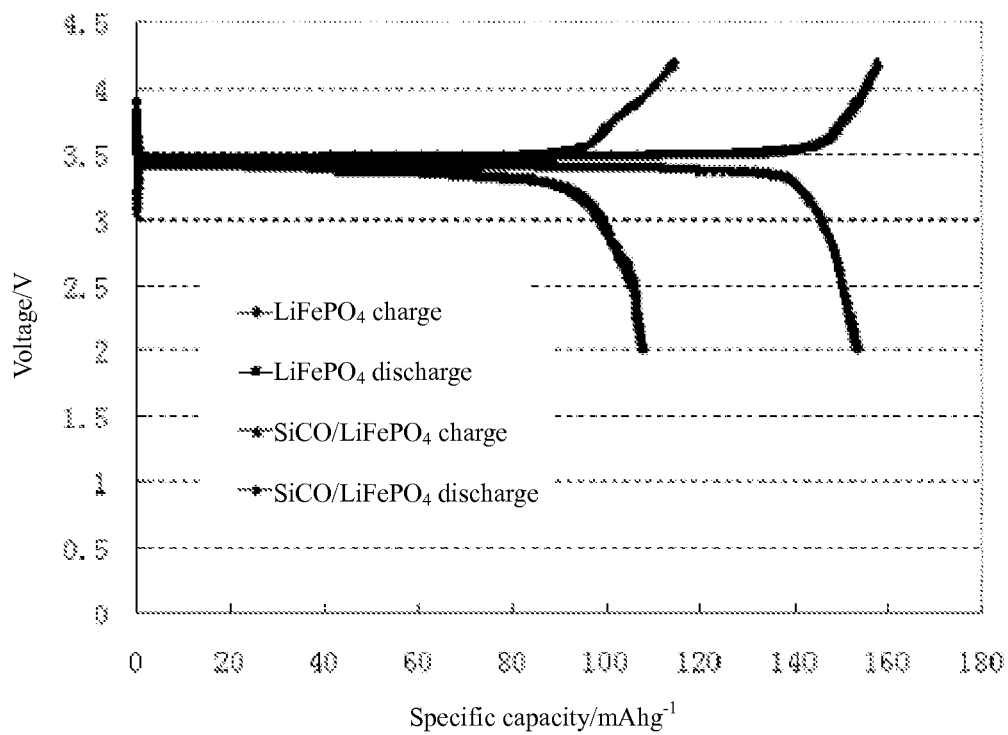
FIG. 9 is the first charge-discharge curve of the $SiCNO/LiFePO_4$ in the embodiment 4.
Figure 10:
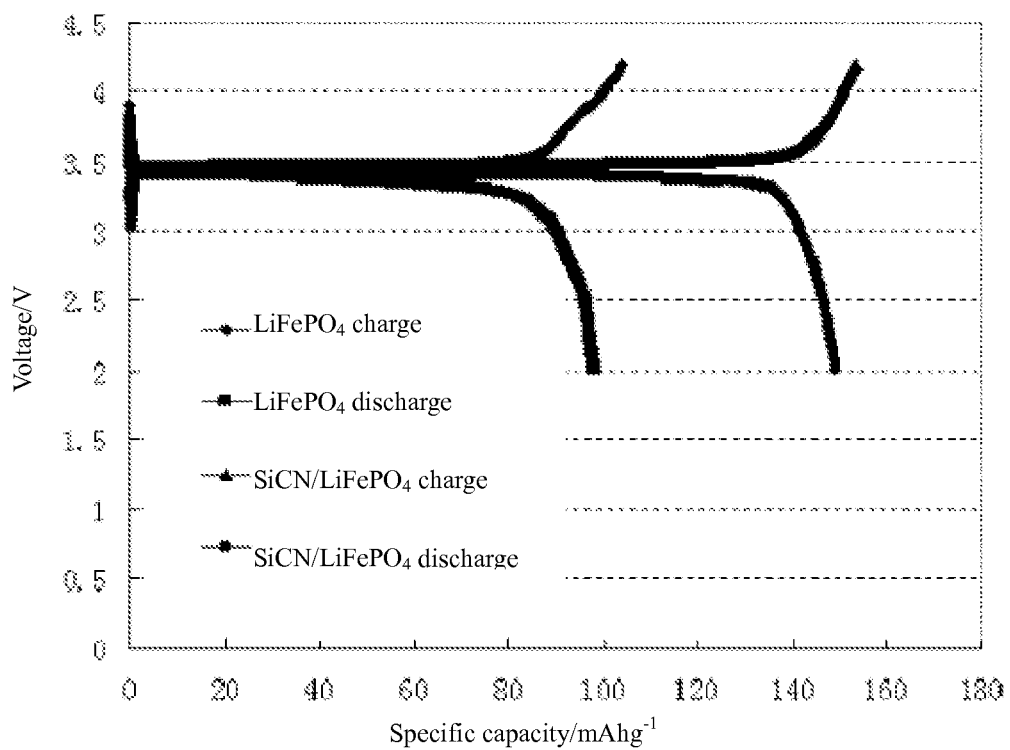
FIG. 10 is the first charge-discharge curve of the SiCO/LiFePO$_4$ in the embodiment 6.
Figure 11:
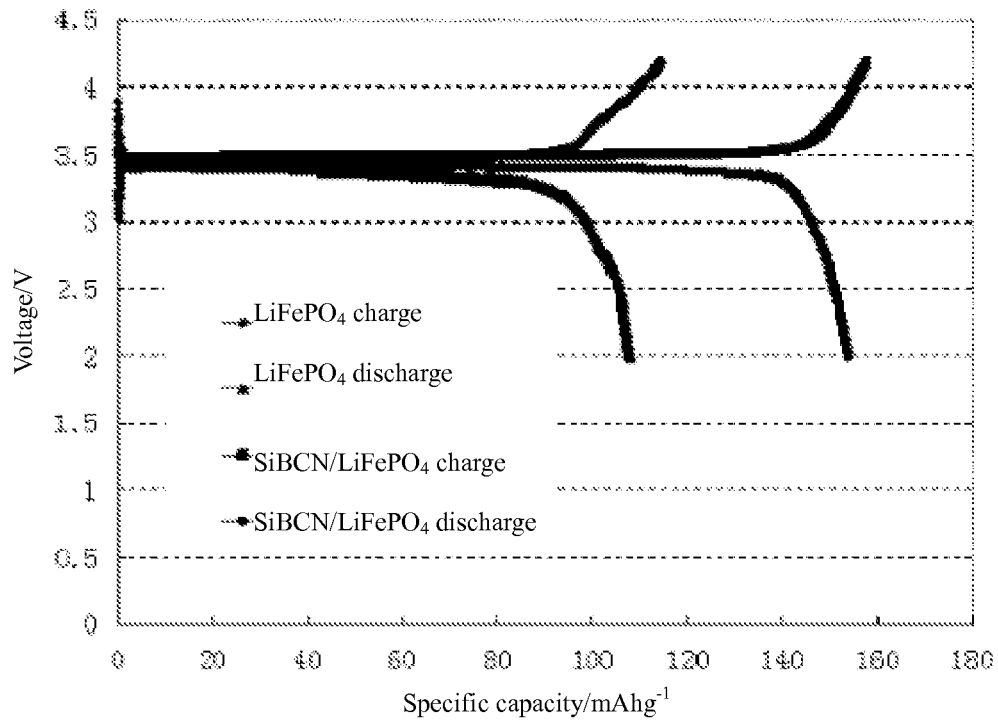
FIG. 11 is the first charge-discharge curve of the SiCN/LiFePO$_4$ in the embodiment 7.
Figure 12:
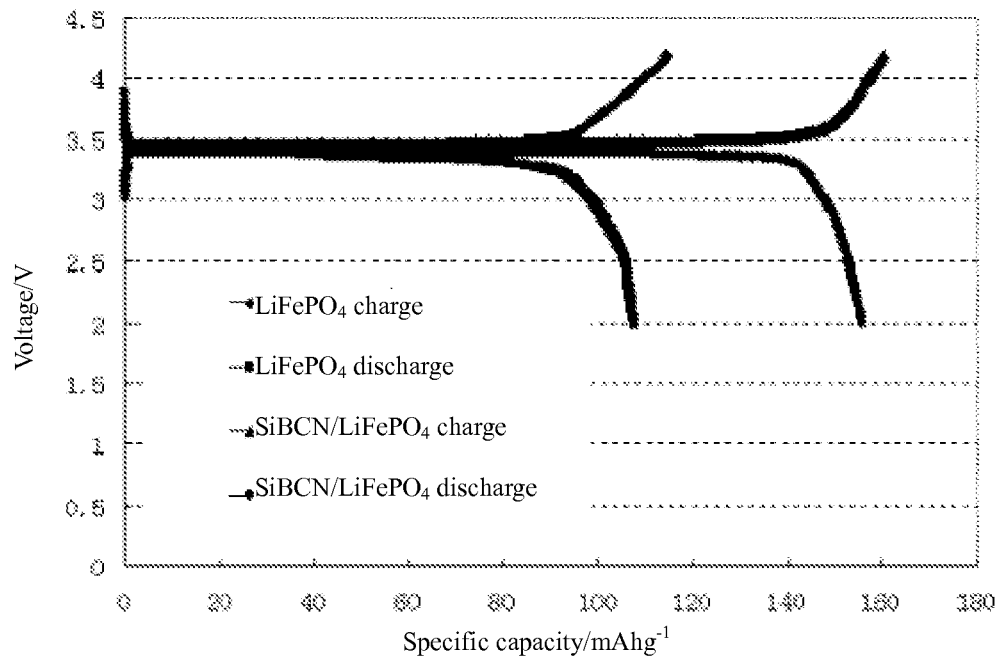
FIG. 12 is the first charge-discharge curve of the SiBCN/LiFePO$_4$ in the embodiment 15.

The technical solution of the invention is explained by combining with the concrete examples as follows:

In order to detect the physical and electrochemical properties of the positive composite material for lithium ion batteries disclosed by the invention, a structure test is carried out by using a Holland X' Pert PRO MPD type XRD diffractometer; a morphology test is carried out by using a field emission scanning electron microscope (FESEM, HITACHI, S4800, acceleration voltage is 100 Kv); a TEM test is carried out by Philips F20. The composite material is assembled into a plate test battery to carry out the electrochemical property test by using the method known by a person skilled in the art. 85-92% (weight percent) of positive composite material for lithium ion batteries disclosed by the invention, 4-8% (weight percent) of conductive agent (graphite or carbon black) and 4-8% (weight percent) of binder PVDF (polyvinylidene fluoride) are mixed into paste, coated at two sides of an aluminum foil, and dried in the air, so as to prepare an electrode, and lithium metal sheet is taken as the counter electrode to assemble a test battery. The electrolyte is 1 M (mol/L) of LiPF$_6$/EC+DMC and the like, wherein EC is ethylene carbonate; DMC is dimethyl carbonate. The charge-discharge current density is 0.1 C; the upper limit and lower limit voltage for charging and discharging are 2.0-4.2V; the specific capacity calculation method is C=mA*h/g, wherein C is the specific capacity; h is discharge time; g is the weight of the active substance; the temperature is 25±2° C. The electrochemical capacity and cycle tests are carried out by a computer controlled constant current tester.

Contrast Example 1

The method comprises the following steps: weighing metal iron powder and lithium dihydrogen phosphate according to the ratio of Li:Fe:P being 1:1:1; carrying out wet-milling until the particle size of the slurry is smaller than 1 μm, and then adding deionized water, wherein the volume of the added deionized water is 5% of that of the slurry; carrying out ball-milling for 0.5 hours, vacuumizing and drying, so as to obtain the precursor; putting the dried precursor into a high-temperature furnace, leading in an inert gas argon after vacuumizing; heating to 650° C., and keeping warm for 10 hours; taking out a product after naturally cooling to below 100° C., so as to obtain LiFePO$_4$ after grinding, wherein the LiFePO$_4$ obtained is a pure phase after the XRD test. The electrochemical property test is carried out when the relative Li$^+$/Li potential is 2.0-4.2V; the first discharge specific capacity is 107 mAh/g; the first charge-discharge efficiency is 94.2%; the tap density is 1.22 g/cm$^3$.

Contrast Example 2

The method comprises the following steps: weighing metal iron powder and lithium dihydrogen phosphate according to the ratio of Li:Fe:P being 1:1:1; carrying out wet-milling until the particle size of the slurry is smaller than 2 μm, and then adding deionized water, wherein the volume of the added deionized water is 10% of that of the slurry; carrying out ball-milling for 0.5 hours, vacuumizing and drying, putting the dried precursor into a high-temperature furnace, leading in an inert gas nitrogen after vacuumizing; heating to 750° C., and keeping warm for 5 hours; taking out a product after naturally cooling to below 100° C., so as to obtain LiFePO$_4$ after grinding, wherein the LiFePO$_4$ obtained is a pure phase after the XRD test. The electrochemical property test is carried out when the relative Li$^+$/Li potential is 2.0-4.2V; the first discharge specific capacity is 95.5 mAh/g; the first charge-discharge efficiency is 92.3%; the tap density is 1.8 g/cm$^3$.

Contrast Example 3

The method comprises the following steps: weighing cane sugar according to 7% of total weight and pure-phase LiFePO$_4$ prepared in the contrast example 1, wherein the total weight is the total weight of the cane sugar and the LiFePO$_4$; adding absolute ethyl alcohol, wherein the amount of the absolute ethyl alcohol is twice of solid volume; drying by microwave drying after ball-milling for 3 hours in a planetary ball mill, and putting into a high-temperature furnace after drying; firstly, vacuumizing and then leading in the inert gas argon; heating to 700° C., and keeping warm for 2 hours; taking out a product after naturally cooling to below 100° C., so as to obtain C/LiFePO$_4$ after grinding. The amount of carbon accounts for 3 wt % of total weight through analysis, wherein the total weight is the total weight of residual carbon after cane sugar being carbonized and the LiFePO$_4$. The electrochemical property test is carried out when the relative Li$^+$/Li potential is 2.0-4.2V; the first discharge specific capacity is 154 mAh/g; the first charge-discharge efficiency is 97.8%; the tap density is 1.1 g/cm$^3$.

The result shows that after the pure phase LiFePO$_4$ being coated with the cane sugar the specific capacity of the material is greatly improved, and improved to 154 mAh/g from 107 mAh/g of the uncoated material; the charge-discharge efficiency is improved to 97.8% from 94.2% before composition, but the tap density of the material is reduced, which reduced to 1.1 g/cm$^3$ from 1.22 g/cm$^3$ before composition.

Contrast Example 4

The method comprises the following steps: dissolving tetraethoxysilane by ethanol, wherein the adding quantity of the ethanol is 3 times of the volume of the tetraethoxysilane; adding the LiFePO$_4$ prepared in the contrast example 1, wherein the weight of the added tetraethoxysilane is calculated by using the pyrolysis rate which is obtained in a manner of pyrolyzing the tetraethoxysilane at the same temperature, so that the pyrolyzed SiO$_2$ accounts for 5 wt % of total weight, wherein the total weight is the total weight of the residual SiO$_2$ after pyrolysis of the tetraethoxysilane and the LiFePO$_4$; agitating for 5 hours, and then drying by distillation at 70° C., so as to obtain the precursor; putting the precursor into a high-temperature furnace; firstly, vacuumizing and then leading in the inert gas argon; heating to 700° C., and keeping warm for 2 hours; taking out a product after naturally cooling to below 100° C., so as to obtain the SiO$_2$/LiFePO$_4$ after grinding. The electrochemical property test is carried out when the relative Li$^+$/Li potential is 2.0-4.2V; the first discharge specific capacity is 115 mAh/g; the first charge-discharge efficiency is 96%; the tap density is 1.4 g/cm$^3$. The result shows that the electrochemical property is improved after the LiFePO$_4$ being compounded by the SiO$_2$; the discharge specific capacity is improved to 115 mAh/g of the compounded material from 107 mAh/g; the first charge-discharge efficiency is reduced to 96% after composition from 94.2% before composition; the tap density is improved to 1.4 g/cm$^3$ after composition from 1.22 g/cm$^3$ before composition, but the improvement of the electrochemical specific capacity is not obvious.

Embodiment 1

The method comprises the following steps: taking vinyl-terminated polymethylphenyl silicone $(C_2H_3)_3SiO\{CH_3(C_6H_5)SiO\}_nSi(C_2H_3)_3$, wherein n is 150; putting into an alumina crucible, and adding acetone to dilute, wherein the volume of the added acetone is three times of that of the vinyl-terminated polymethylphenyl silicone, and then adding the LiFePO$_4$ prepared by the method in the contrast example 1, adding the vinyl-terminated polymethylphenyl silicone according to 5 wt % of SiCO in SiCO/LiFePO$_4$, wherein the adding amount of the vinyl-terminated polymethylphenyl silicone is calculated by the pyrolysis rate of the vinyl-terminated polymethylphenyl silicone under the same experiment condition; heating to 400° C. when agitating after adding, keeping for 5 hours, so as to form the precursor after the polysiloxane being solidified; putting the crucible containing the precursor into the high-temperature furnace; leading in the inert gas N$_2$ after vacuumizing; heating to 700° C., keeping warm for 2 hours and then taking out the product after naturally cooling to below 100° C., so as to obtain the SiCO/LiFePO$_4$ composite material after grinding, wherein SiCO accounts for 5 wt % of total weight; the electrochemical property is tested when the relative Li$^+$/Li potential is 2.0-4.2V; the first discharge specific capacity is 158.2 mAh/g; the first charge-discharge efficiency is 97.35%; the tap density is 1.55 g/cm$^3$. The result can show that the composite material SiCO/LiFePO$_4$ in the embodiment is formed by compounding the LiFePO$_4$ in the contrast example 1 by the vinyl-terminated polymethylphenyl silicone, and the SiCO in the composite material SiCO/LiFePO$_4$ accounts for 5 wt % of total weight, and the electrochemical property and the tap density are significantly improved. The electrochemical specific capacity is improved to 158.2 mAh/g after composition from 107 mAh/g before composition; the first charge-discharge efficiency is improved to 97.35% after composition from 94.2% before composition; the tap density is improved to 1.55 g/cm$^3$ after composition from 1.22 g/cm$^3$ before composition; the tap density is obviously better than that of the composite material C/LiFePO$_4$ which is coated by the cane sugar in the contrast example 3; the electrochemical property is obviously better than that of the composite material SiO$_2$/LiFePO$_4$ which is coated by the SiO$_2$ in the contrast example 4.

Embodiment 2

The method comprises the following steps: taking hydroxy-terminated polymethylphenyl silicone $(OH)_3SiO\{CH_3(C_6H_5)SiO\}_nSi(OH)_3$, wherein n is 50; putting into an alumina crucible, and adding acetone to dilute, wherein the volume of the added acetone is four times of that of the hydroxy-terminated polymethylphenyl silicone, and then adding the LiFePO$_4$ in the contrast example 1, adding the hydroxy-terminated polymethylphenyl silicone according to 7.5 wt % of SiCO in SiCO/LiFePO$_4$, wherein the adding amount of the hydroxy-terminated polymethylphenyl silicone is calculated by the pyrolysis rate of the hydroxy-terminated polymethylphenyl silicone under the same experiment condition; heating to 300° C. when agitating after adding, keeping for an hour, so as to form the precursor after curing the polysiloxane; putting the crucible containing the precursor into the high-temperature furnace; leading in the inert gas N$_2$ after vacuumizing; heating to 725° C., keeping warm for 2 hours and then taking out the product after naturally cooling to below 100° C., so as to obtain the SiCO/LiFePO$_4$ composite material after grinding, wherein SiCO accounts for 7.5 wt % of total weight; the electrochemical property is tested when the relative Li$^+$/Li potential is 2.0-4.2V; the first discharge specific capacity is 157.2 mAh/g; the first charge-discharge efficiency is 98%; the tap density is 1.65 g/cm$^3$.

Embodiment 3

The method comprises the following steps: taking hydroxy-terminated polymethyl ethoxylated siloxane $(OH)_3SiO\{CH_3(OC_2H_5)SiO\}_nSi(OH)_3$, wherein n is 150; putting into an alumina crucible, and adding toluene to dilute, wherein the volume of the added toluene is 1.5 times of that of the hydroxy-terminated methyl ethoxylated siloxane, and then adding the LiFePO$_4$ in the contrast example 1, adding the hydroxy-terminated methyl ethoxylated siloxane according to 3 wt % of SiCO in SiCO/LiFePO$_4$, wherein the adding amount of the hydroxy-terminated methyl ethoxylated siloxane is calculated by the pyrolysis rate of the hydroxy-terminated methyl ethoxylated siloxane under the same experiment condition; heating to 300° C. when agitating after adding, keeping for an hour, so as to form the precursor after curing the siloxane; putting the crucible containing the precursor into the high-temperature furnace; leading in the inert gas N$_2$ after vacuumizing; heating to 650° C., keeping warm for 5 hours and then taking out the product after naturally cooling to below 100° C., so as to obtain the SiCO/LiFePO$_4$ composite material after grinding, wherein SiCO accounts for 3 wt % of total weight; the electrochemical property is tested when the relative Li$^+$/Li potential is 2.0-4.2V; the first discharge specific capacity is 154 mAh/g; the first charge-discharge efficiency is 98.0%; the tap density is 1.53 g/cm$^3$.

Embodiment 4

The method comprises the following steps: taking polymethyl hydrogen siloxane $(CH_3)_3SiO\{CH_3(H)SiO\}_mSi(OH)_3$ (m=20), adding dimethylbenzene, wherein the volume of the added dimethylbenzene is twice of that of the polymethyl hydrogen siloxane, adding a curing agent divinyl benzene according to the weight ratio of the poly-methyl hydrogen siloxane to the curing agent being 2:1; adding a few drops of catalyst chloroplatinic acid ethanol solution (1 mg/100 ml of ethanol), simultaneously adding the LiFePO$_4$ in the contrast example 1 when agitating, adding the poly-methyl hydrogen siloxane according to 7.5 wt % of SiCNO in SiCNO/LiFePO$_4$, wherein the adding amount of the poly-methyl hydrogen siloxane is calculated by the pyrolysis rate of the poly-methyl hydrogen siloxane under the same experiment condition; heating to 120° C. when agitating, and carrying out cross-linking and curing the poly-methyl hydrogen siloxane and the divinyl benzene so as to form the precursor; then putting the obtained precursor into the high-temperature furnace; leading in NH$_3$ after vacuumizing; heating to 350° C., keeping warm for 3 hours and then heating to 800° C., keeping warm for 3 hours; taking out the product after naturally cooling to below 100° C., so as to obtain the composite material SiCNO/LiFePO$_4$ after grinding, wherein SiCNO accounts for 7.5 wt % of total weight. The material displays the lithium iron phosphate structure by the XRD test. The electrochemical property is tested when the relative Li$^+$/Li potential is 2.0-4.2V; the first discharge specific capacity is 153.5 mAh/g; the first charge-discharge efficiency is 98.1%; the tap density is 1.65 g/cm$^3$.

Embodiment 5

The method comprises the following steps: taking poly-methyl vinyl siloxane $(CH_3)_3SiO\{CH_3(CH=CH_2)SiO\}_nSi(CH_3)_3$ (n=400), and dissolving it by acetone, wherein the volume of the added acetone is twice of that of the poly-methyl vinyl siloxane, then adding the LiFePO$_4$ which is synthetized in the contrast example 1, wherein the adding amount of the poly-methyl vinyl siloxane is that SiCO accounts for 10 wt % in SiCO/LiFePO$_4$, and the adding amount of the poly-methyl vinyl siloxane is calculated by the pyrolysis rate of the poly-methyl vinyl siloxane under the same experiment condition; heating to 400° C. when agitating, keeping for an hour, so as to obtain the precursor after curing the poly-methyl vinyl siloxane; then putting the precursor into the high-temperature furnace, leading in the inert gas N$_2$ after vacuumizing; heating to 750° C., keeping warm for 2 hours and then taking out the product after naturally cooling to below 100° C., so as to obtain the composite material SiCO/LiFePO$_4$ after grinding, wherein SiCO accounts for 10 wt % of total weight; the electrochemical property is tested when the relative Li$^+$/Li potential is 2.0-4.2V; the first discharge specific capacity is 155.2 mAh/g; the first charge-discharge efficiency is 98.3%; the tap density is 1.73 g/cm$^3$.

Embodiment 6

The method comprises the following steps: diluting poly-methyl hydrogen siloxane $(CH_3)_3SiO\{CH_3(CH_3(H)SiO\}_mSi(CH_3)_3$ (m=40) by acetone, wherein the volume of the added acetone is 1.5 times of that of the polymethyl hydrogen siloxane, adding a curing agent divinyl phenyl according to the weight ratio of the polymethyl hydrogen siloxane to the curing agent being 2:1; adding the LiFePO$_4$ which is synthetized in the contrast example 2 when agitating, wherein the adding amount of the polymethyl hydrogen siloxane is that the SiCO accounts for 7.5 wt % in SiCO/LiFePO$_4$, and the adding amount of the polymethyl hydrogen siloxane is calculated by the pyrolysis rate of the polymethyl hydrogen siloxane under the same experiment condition; heating to 150° C. when agitating, crosslinking and curing the polymethyl hydrogen siloxane and the divinyl phenyl, so as to obtain the precursor; then putting the obtained precursor into the high-temperature furnace, leading in the inert gas N$_2$ after vacuumizing; heating to 450° C., keeping warm for 3 hours; then heating to 650° C. and keeping warm for 5 hours, and then taking out the product after naturally cooling to below 100° C., so as to obtain the composite material of SiCO/LiFePO$_4$ after grinding, wherein SiCO accounts for 7.5 wt % of total weight. The material displays the lithium iron phosphate structure by the XRD test. The electrochemical property is tested when the relative Li$^+$/Li potential is 2.0-4.2V; the first discharge specific capacity is 148.3 mAh/g; the first charge-discharge efficiency is 97.6%; the tap density is 2.0 g/cm$^3$.

Embodiment 7

The method comprises the following steps: dissolving methyl vinyl polysilazane $(CH_3)_3SiNH[CH_3(C_2H_3)SiNH]_nSi(CH_3)_3$ (n=30) into toluene, wherein the adding quantity of the toluene is twice of the volume of the methyl vinyl polysilazane; and adding the pure-phase LiFePO$_4$ synthetized in the contrast example 1, wherein the adding amount of the methyl vinyl polysilazane is that SiCN accounts for 3 wt % in SiCN/LiFePO$_4$, and the adding amount of the methyl vinyl polysilazane is calculated by the pyrolysis rate of the methyl vinyl polysilazane under the same experiment condition; heating to volatilize the toluene when agitating, and heating to 350° C. to cure, so as to obtain the precursor; putting the precursor into the high-temperature furnace; vacuumizing and then charging the inert gas N$_2$; heating to 400° C. and keeping warm for 2 hours, and then heating to 800° C. and keeping warm for 2 hours; taking out the product after naturally cooling to below 100° C., so as to obtain the SiCN/LiFePO$_4$ composite material after grinding, wherein SiCN accounts for 3 wt % of total weight. The material displays the lithium iron phosphate structure by the XRD test. The electrochemical property test is carried out when the relative Li$^+$/Li potential is 2.0-4.2V; the first discharge specific capacity is 156 mAh/g; the first charge-discharge efficiency is 98.2%; the tap density is 1.6 g/cm$^3$.

Embodiment 8

The method comprises the following steps: dissolving hydroxyl-terminated methyl phenyl polysilazane $(OH)_3SiNH[CH_3(C_6H_5)SiNH]_nSi(OH)_3$ (n=150) into toluene, wherein the adding quantity of the toluene is three times of the volume of the hydroxyl-terminated methyl phenyl polysilazane; adding the pure-phase LiFePO$_4$ which is synthetized in the contrast example 1, wherein the adding amount of the hydroxyl-terminated methyl phenyl polysilazane is that SiCN accounts for 5 wt % in the SiCN/LiFePO$_4$, and the adding amount of the hydroxyl-terminated methyl phenyl polysilazane is calculated by the pyrolysis rate of the hydroxyl-terminated methyl phenyl polysilazane under the same experiment condition; heating to volatilize the toluene when agitating, and heating to 350° C. to cure, so as to obtain the precursor; putting the precursor into the high-temperature furnace; vacuumizing and then charging the inert gas N$_2$; heating to 300° C. and keeping warm for 2 hours, and then heating to 750° C. and keeping warm for 4 hours; taking out the product after naturally cooling to below 100° C., so as to obtain the SiCN/LiFePO$_4$ composite material after grinding, wherein the SiCN accounts for 5 wt % of total weight. The material displays the lithium iron phosphate structure by the XRD test. The electrochemical property test is carried out when the relative Li$^+$/Li potential is 2.0-4.2V; the first discharge specific capacity is 157 mAh/g; the first charge-discharge efficiency is 97.2%; the tap density is 1.65 g/cm$^3$.

Embodiment 9

The method comprises the following steps: dissolving hydroxyl-terminated methyl ethyoxyl polysilazane $(OH)_3SiNH[CH_3(OC_2H_5)_nSiNH]_nSi(OH)_3$ (n=130) into toluene, wherein the adding quantity of the toluene is twice of the volume of the hydroxyl-terminated methyl ethyoxyl polysilazane; adding the pure-phase LiFePO$_4$ which is synthetized in the contrast example 1, wherein the adding amount of the hydroxyl-terminated methyl ethyoxyl polysilazane is that SiCN accounts for 7.5 wt % in the SiCN/LiFePO$_4$, and the adding amount of the hydroxyl-terminated methyl ethyoxyl polysilazane is calculated by the pyrolysis rate of the hydroxyl-terminated methyl ethyoxyl polysilazane under the same experiment condition; heating to volatilize the toluene when agitating, and heating to 350° C. to cure, so as to obtain the precursor; putting the precursor into the high-temperature furnace; vacuumizing and then charging the inert gas N$_2$;

heating to 400° C. and keeping warm for 2 hours, and then heating to 800° C. and keeping warm for 2 hours; taking out the product after naturally cooling to below 100° C., so as to obtain the SiCN/LiFePO$_4$ composite material after grinding, wherein SiCN accounts for 7.5 wt % of total weight. The material displays the lithium iron phosphate structure by the XRD test. The electrochemical property test is carried out when the relative Li$^+$/Li potential is 2.0-4.2V; the first discharge specific capacity is 154 mAh/g; the first charge-discharge efficiency is 98.1%; the tap density is 1.67 g/cm$^3$.

Embodiment 10

The method comprises the following steps: taking hydroxyl-terminated polysiloxane containing amino (OH)$_3$SiO{CH$_3$[(C$_3$H$_6$)NH$_2$]]SiO}$_n$Si(OH)$_3$ (N=100) to put into an alumina crucible, adding acetone to dissolve, wherein the volume of the added acetone is 4.5 times of that of the hydroxyl-terminated polysiloxane containing amino, adding the cane sugar and the LiFePO$_4$ of the contrast example 1, wherein the adding amount of the cane sugar and the hydroxyl-terminated polysiloxane containing amino respectively is that C accounts for 1 wt % and SiCO accounts for 15 wt % in the C/SiCO/LiFePO$_4$, and the adding amount of the cane sugar and the hydroxyl-terminated polysiloxane containing amino is calculated according to the pyrolysis rates of the cane sugar and the hydroxyl-terminated polysiloxane containing amino under the same experiment condition; heating to 200° C. when agitating, and keeping for three hours, so as to obtain the precursor after curing the polysiloxane; putting the crucible containing the precursor into the high-temperature furnace, leading in the inert gas N$_2$ after vacuumizing; heating to 675° C. and keeping warm for 4 hours, and then taking out the product after naturally cooling to below 100° C., so as to obtain the composite material C/SiCO/LiFePO$_4$ after grinding, wherein the residual carbon after carbonation decomposition of the cane sugar accounts for 1 wt % of the total weight, and the SiCO accounts for 15 wt % of the total weight which is the sum weight of the residual carbon after carbonation decomposition, the weight of SiCO after pyrolysis of the hydroxyl-terminated polysiloxane containing amino, and the weight of LiFePO$_4$. The material displays the lithium iron phosphate structure by the XRD test. The electrochemical property is tested when the relative Li$^+$/Li potential is 2.0-4.2V; the first discharge specific capacity is 160.2 mAh/g; the first charge-discharge efficiency is 98.35%; the tap density is 1.5 g/cm$^3$.

Embodiment 11

The method comprises the following steps: taking thermocuring silicon resin-polymethyl phenyl siloxane (CH$_3$)$_3$SiO{CH$_3$(C$_6$H$_5$)SiO}$_n$Si(CH$_3$)$_3$ (n=200) to put into an alumina crucible, adding dimethylbenzene to dissolve, wherein the volume of the added dimethylbenzene is 3.5 times of that of the thermocuring silicon resin, adding the LiFePO$_4$ of the contrast example 1, wherein the adding amount of the thermocuring silicon resin is that SiCO accounts for 20 wt % in the SiCO/LiFePO$_4$, and the adding amount of the thermocuring silicon resin is calculated according to the pyrolysis rate of the thermocuring silicon resin under the same experiment condition; heating to 210° C. when agitating and keeping for three hours, so as to obtain the precursor after curing the silicon resin; putting the crucible containing the precursor into the high-temperature furnace, leading in the inert gas N$_2$ after vacuumizing; heating to 825° C. and keeping warm for 4 hours, and then taking out the product after naturally cooling to below 100° C., so as to obtain the composite material SiCO/LiFePO$_4$ after grinding, wherein the SiCO accounts for 20 wt % of the total weight. The material displays the lithium iron phosphate structure by the XRD test. The electrochemical property is tested when the relative Li$^+$/Li potential is 2.0-4.2V; the first discharge specific capacity is 159.3 mAh/g; the first charge-discharge efficiency is 98.8%; the tap density is 1.67 g/cm$^3$.

Embodiment 12

The method comprises the following steps: taking polysiloxane containing carboxyl in the side chain (CH$_3$)$_3$SiO{[(CH$_2$)$_m$(COOH)](C$_6$H$_5$)SiO}$_n$Si(CH$_3$)$_3$ (n=150) to put into an alumina crucible, adding acetone to dilute, wherein the volume of the added acetone is 1.5 times of that of the polysiloxane containing carboxyl in the side chain, adding the LiFePO$_4$ of the contrast example 1, wherein the adding amount of the polysiloxane containing carboxyl in the side chain is that SiCO accounts for 2 wt % in the SiCO/LiFePO$_4$, and the adding amount of the polysiloxane containing carboxyl in the side chain is calculated according to the pyrolysis rate of the polysiloxane containing carboxyl in the side chain under the same experiment condition; heating to 360° C. when agitating, and keeping warm for 6 hours, so as to obtain the precursor after curing the polysiloxane; putting the crucible containing the precursor into the high-temperature furnace, leading in the inert gas N$_2$ after vacuumizing; heating to 600° C. and keeping warm for 10 hours, and then taking out the product after naturally cooling to below 100° C., so as to obtain the composite material SiCO/LiFePO$_4$ after grinding, wherein the SiCO accounts for 2 wt % of the total weight. The material displays the lithium iron phosphate structure by the XRD test. The electrochemical property is tested when the relative Li$^+$/Li potential is 2.0-4.2V; the first discharge specific capacity is 155.2 mAh/g; the first charge-discharge efficiency is 98.4%; the tap density is 1.5 g/cm$^3$.

Embodiment 13

The method comprises the following steps: taking hydroxyl-terminated poly-fluorinated phenyl butyl siloxane (OH)$_3$SiO{C$_4$H$_9$(C$_6$H$_4$F)SiO}$_n$Si(OH)$_3$ (n=80) to put into an alumina crucible, adding acetone to dissolve, wherein the volume of the added acetone is 2.5 times of that of the hydroxyl-terminated poly-fluorinated phenyl butyl siloxane, adding the LiFePO$_4$ of the contrast example 1, wherein the adding amount of the hydroxyl-terminated poly-fluorinated phenyl butyl siloxane is that SiCO accounts for 3 wt % in the SiCO/LiFePO$_4$, and the adding amount of the hydroxyl-terminated poly-fluorinated phenyl butyl siloxane is calculated according to the pyrolysis rate of the hydroxyl-terminated poly-fluorinated phenyl butyl siloxane under the same experiment condition; heating to 300° C. when agitating, and keeping warm for 3 hours, so as to obtain the precursor after curing the hydroxyl-terminated poly-fluorinated phenyl butyl siloxane; putting the crucible containing the precursor into the high-temperature furnace, leading in the inert gas N$_2$ after vacuumizing; heating to 675° C. and keeping warm for 4 hours, and then taking out the product after naturally cooling to below 100° C., so as to obtain the composite material SiCO/LiFePO$_4$ after grinding, wherein the SiCO accounts for 3 wt % of the total weight. The material displays the lithium iron phosphate structure by the XRD test. The electrochemical property is tested when the relative Li$^+$/Li potential is 2.0-4.2V; the first discharge specific capacity is 159.2 mAh/g; the first charge-discharge efficiency is 98.25%; the tap density is 1.65 g/cm³.

Embodiment 14

The method comprises the following steps: taking hydroxyl-terminated polydimethylsiloxane OH(CH₃)₂SiO{(CH₃)₂₄SiO}ₙSi(CH₂)OH (n=200) to put into an alumina crucible; adding a curing agent (CH₃)₃Si{OSiH(CH₃)}₃₆OSi(CH₃)₃, wherein the ratio of the curing agent to the hydroxyl-terminated polydimethylsiloxane is 1:5; adding a catalyst dibutyltin dilaurate, wherein the adding amount of the catalyst accounts for 0.8% of total weight; adding a solvent dimethylbenzene, wherein the volume of the added dimethylbenzene is 1.5 times of the volume of the hydroxyl-terminated polydimethylsiloxane and the curing gent; then adding the LiFePO₄ of the contrast example 1, wherein the adding amount of the hydroxyl-terminated polydimethylsiloxane and the curing agent is that SiCO accounts for 6 wt % in the SiCO/LiFePO₄, and the adding amount of the hydroxyl-terminated polydimethylsiloxane and the curing agent is calculated according to the pyrolysis rate of the hydroxyl-terminated polydimethylsiloxane under the same experiment condition; heating to 70° C. when agitating, and keeping warm for 3 hours, so as to obtain the precursor after curing the hydroxyl-terminated polydimethylsiloxane; putting the crucible containing the precursor into the high-temperature furnace, leading in the inert gas N₂ after vacuumizing; heating to 650° C. and keeping warm for 8 hours, and then taking out the product after naturally cooling to below 100° C., so as to obtain the composite material SiCO/LiFePO₄ after grinding, wherein the SiCO accounts for 6 wt % of the total weight. The material displays the lithium iron phosphate structure by the XRD test. The electrochemical property is tested when the relative Li⁺/Li potential is 2.0-4.2V; the first discharge specific capacity is 152.2 mAh/g; the first charge-discharge efficiency is 98.1%; the tap density is 1.61 g/cm³.

Embodiment 15

The molecular structural formula of polyborosilazane is shown in the figure as follows, wherein m is 40, n is 120 and p is 40. The method comprises the following steps: dissolving the polyborosilazane by toluene, and then adding the LiFePO₄ of the contrast example 1, wherein the adding amount of the polyborosilazane is that SiBCN accounts for 5 wt % in the SiBCN/LiFePO₄, and the adding amount of the polyborosilazane is calculated according to the pyrolysis rate of the polyborosilazane under the same experiment condition; heating to 250° C. and keeping warm for 2 hours; putting into the high-temperature furnace after agitating and curing; leading in N₂ after vacuumizing; heating to 850° C. and keeping warm for an hour, and then taking out the product after naturally cooling to below 100° C., so as to obtain the composite material SiBCN/LiFePO₄ after grinding, wherein the SiBCN accounts for 5 wt % of total weight. The material displays the lithium iron phosphate structure by the XRD test. The electrochemical property is tested when the relative Li⁺/Li potential is 2.0-4.2V; the first discharge specific capacity is 155 mAh/g; the first charge-discharge efficiency is 97.9%; the tap density is 1.7 g/cm³.

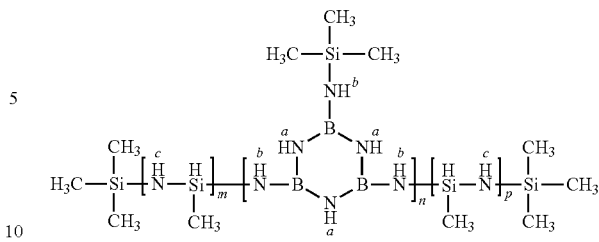

The result can show that the SiBCN in the composite material SiBCN/LiFePO₄ which is formed by compounding the LiFePO₄ of the contrast example 1 and the polyborosilazane in the embodiment accounts for 5 wt % of total weight, and the electrochemical property and the tap density of the composite material are significantly improved. The electrochemical specific capacity is improved to 155 mAh/g after composition from 107 mAh/g before composition; the first charge-discharge efficiency is improved to 97.9% after composition from 94.2% before composition; the tap density is improved to 1.7 g/cm³ after composition from 1.22 g/cm³ before composition; the tap density is obviously better than the effect of the composite material C/LiFePO₄ which is coated by the cane sugar in the contrast example 3; the electrochemical property is obviously better than that of the composite material SiO₂/LiFePO₄ which is coated by the SiO₂ in the contrast example 4.

TABLE 1

Electrochemical property and tap density of the materials in the embodiments

| Sample | Electrochemical specific capacity (mAh/g) | First charge-discharge efficiency (%) | Tap density (g/cm³) |
| --- | --- | --- | --- |
| Contrast example 1 | 107 | 94.2 | 1.22 |
| Contrast example 2 | 95.5 | 92.3 | 1.8 |
| Contrast example 3 | 154 | 97.8 | 1.1 |
| Contrast example 4 | 115 | 96 | 1.4 |
| Embodiment 1 | 158.2 | 97.35 | 1.55 |
| Embodiment 2 | 157.2 | 98 | 1.65 |
| Embodiment 3 | 154 | 98 | 1.53 |
| Embodiment 4 | 153.5 | 98.1 | 1.65 |
| Embodiment 5 | 155.2 | 98.3 | 1.73 |
| Embodiment 6 | 148.3 | 97.6 | 2.0 |
| Embodiment 7 | 156 | 98.2 | 1.6 |
| Embodiment 8 | 157 | 97.2 | 1.65 |
| Embodiment 9 | 154 | 98.1 | 1.67 |
| Embodiment 10 | 160.2 | 98.35 | 1.5 |
| Embodiment 11 | 159.3 | 98.8 | 1.67 |
| Embodiment 12 | 155.2 | 98.4 | 1.5 |
| Embodiment 13 | 159.2 | 98.25 | 1.65 |
| Embodiment 14 | 152.2 | 98.1 | 1.61 |
| Embodiment 15 | 155 | 97.9 | 1.7 |

The invention claimed is:

1. A positive composite material for lithium ion batteries, characterized by being compounded with $Li_aM_bPO_4$ by at least one of SiCO, SiCNO, SiCN and SiBCN, wherein $0.95 \leq a \leq 1.1$; $0.95 \leq b \leq 1.1$; M is at least one of Fe, Co, Ni and Mn; at least one of SiCO, SiCNO, SiCN and SiBCN accounts for 1-20 wt % of total weight of the composite material; the $Li_aM_bPO_4$ accounts for 80-99 wt % of total weight of the composite material.

2. The composite material according to claim 1, wherein the SiCO or SiCNO is prepared by pyrolysis of polysiloxane, SiCN is prepared by pyrolysis of polysilazane, and SiBCN is prepared by pyrolysis of polyborosilazane.

3. The composite material according to claim 2, wherein the polysiloxane is a polymer wherein a repeated Si—O bond is taken as the main chain; silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, hydrogen, alkenyl and halogen, the polymerization degree is 2-2,000.

4. The composite material according to claim 3, wherein the polymerization degree of the polysiloxane is 5-500.

5. The composite material according to claim 3, wherein the alkyl is alkyl, alkenyl, alkynyl, aryl and aralkyl.

6. The composite material according to claim 3, wherein the polysiloxane is the polysiloxane containing the Si—H bond in the molecule.

7. The composite material according to claim 3, wherein the polysiloxane is the polysiloxane containing the Si—OH bond in the molecule.

8. The composite material according to claim 3, wherein the polysiloxane is the polysiloxane containing unsaturated hydrocarbon or an unsaturated hydrocarbon derivatives in the molecule.

9. The composite material according to claim 3, wherein the polysiloxane is the polysiloxane containing phenyl in the molecule.

10. The composite material according to claim 3, wherein the polysiloxane is thermocuring silicon resin.

11. The composite material according to claim 3, wherein the polysiloxane is liquid polysiloxane or the polysiloxane which can be dissolved with a solvent or can be fused.

12. The composite material according to claim 2, wherein the polysilazane is a polymer wherein the repeated Si—N bond is taken as the main chain, and silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, hydrogen, alkenyl and halogen; the polymerization of the polysilazane degree is 2-2,000.

13. The composite material according to claim 12, wherein the polymerization degree of the polysilazane is 5-500.

14. The composite material according to claim 12, wherein the alkyl is alkyl, alkenyl, alkynyl, aryl and aralkyl.

15. The composite material according to claim 12, wherein the polysilazane is the polysilazane containing the Si—H bond in the molecule.

16. The composite material according to claim 12, wherein the polysilazane is the polysilazane containing the Si—OH bond in the molecule.

17. The composite material according to claim 12, wherein the polysilazane containing unsaturated hydrocarbon or an unsaturated hydrocarbon derivatives in the molecule.

18. The composite material according to claim 12, wherein the polysilazane containing phenyl in the molecule.

19. The composite material according to claim 12, wherein the polysilazane is liquid polysilazane or the polysilazane which can be dissolved with a solvent or can be fused.

20. The composite material according to claim 2, wherein the polyborosilazane is a polymer wherein repeated —C—Si—N—B— or —B—C—Si—N— or —C—B—Si—N— is taken as the main chain, and silicon on the side chain is directly connected with one or more of alkyl, carboxyl, hydroxyl, amino, alkoxy, alkenoxy, acyloxy, hydrogen, halogen and alkyl containing hydroxyl, carboxyl, amino, hydrogen, alkenyl and halogen; the polymerization degree is 2-2,000.

21. The composite material according to claim 20, wherein the polymerization degree of the polyborosilazane is 5-500.

22. The composite material according to claim 20, wherein the alkyl is alkyl, alkenyl, alkyny, aryl and aralkyl.

23. The composite material according to claim 20, wherein the polyborosilazane is liquid polyborosilazane or the polyborosilazane which can be dissolved with a solvent or can be fused.

24. A method for preparing the composite material according to claim 1, comprising the following steps:
  (1) dissolving at least one of the polysiloxane, the polysilazane and the polyborosilazane into an organic solvent, wherein the adding amount of the organic solvent is that according to the volume ratio of the added polymer to the solvent is 1:1 to 1:5, and the adding amount of at least one of the polysiloxane, the polysilazane and the polyborosilazane is calculated according to the pyrolysis rate under the same experiment condition, so that at least one of SiCO, SiCNO, SiCN and SiBCN in the pyrolyzed positive composite material accounts for 1-20 wt % of the total weight of the composite material; then adding $Li_aM_bPO_4$, wherein the adding amount of the $Li_aM_bPO_4$ is calculated according to the pyrolysis rate under the same experiment condition, so that the $Li_aM_bPO_4$ in the pyrolyzed positive composite material accounts for 80-99 wt % of the total weight of the composite material, and evenly agitating;
  (2) curing to form a crosslinked product;
  (3) sintering the cured product in a non-oxidizing atmosphere or vacuum, so as to obtain the composite material wherein the $Li_aM_bPO_4$ is compounded with at least one of SiCO, SiCNO, SiCN and SiBCN.

25. The method according to the claim 24, wherein the organic solvent is at least one of acetone, toluene, dimethylbenzene, ethanol, diethyl ether, normal propyl alcohol, isopropanol, n-butyl alcohol, acetonitrile, cholamine, tetrahydrofuran, dimethyl formamide (DMF), chloroform, pyridine and N-methylpyrrolidone.

26. The method according to the claim 24, wherein the curing is at least one of heat curing, heat curing after adding a curing agent, and UV curing, wherein the curing temperature in the heat curing or the heat curing by adding the curing agent is 20-400° C.

27. The method according to the claim 24, wherein the sintering condition in the sintering process in the step (3) is keeping warm at 300-500° C. for 0-5 hours, then heating to 500-850° C., and keeping warm for 1-15 hours.

28. The method according to the claim 27, wherein the sintering condition is keeping warm at 300-500° C. for 0-5 hours, then heating to 600-750° C., and keeping warm for 1-10 hours.

29. The method according to the claim 24, wherein the non-oxidizing atmosphere is at least one of argon, nitrogen, $NH_3$ and $H_2$.

30. The method according to the claim 24, wherein carbon or a carbon precursor is added before $Li_aM_bPO_4$ after at least one of the polysiloxane, the polysilazane and the polyborosilazane being dissolved into the organic solvent, and the residual carbon after the carbon or the carbon precursor being carbonized accounts for 1-20 wt % of the total weight of the composite material.

31. The method according to the claim 30, wherein the carbon or the carbon precursor is at least one of graphite, acetylene black, cane sugar, glucose, fructose and phenolic resin.

32. The method according to the claim 24, wherein the $Li_aM_bPO_4$ is prepared from metal M powder and lithium dihydrogen phosphate by a solid-state method.

33. The method according to the claim 32, wherein the solid-state method comprises the following steps: adding the metal M powder and the lithium dihydrogen phosphate according to a molecular expression of the $Li_aM_bPO_4$ according to the claim 1; adding a solvent to carry out wet grinding, wherein the adding amount of the solvent is according to the solid-liquid volume ratio of 1:1 to 1:5; adding deionized water after carrying out wet grinding until the particle size is smaller than 2 μm, wherein the adding volume of the deionized water is 5-50% of the volume of the slurry; drying to obtain a precursor; putting into a high-temperature furnace, heating to 300-500° C. in the non-oxidizing atmosphere or vacuum; keeping warm for 0-10 hours, then heating to 600-850° C., and keeping warm for 2-24 hours, naturally cooling, so as to obtain pure-phase $Li_aM_bPO_4$.

34. The method according to the claim 33, wherein the solvent is one of ethanol, acetone, normal propyl alcohol, normal butanol, cholamine and isopropanol.

35. The method according to the claim 33, wherein the deionized water is added by agitating while adding, and then ball-milling for 0.5-1 hour after the deionized water being added.

36. The method according to the claim 33, wherein the non-oxidizing atmosphere comprises at least one or a mixture of argon, nitrogen and $H_2$.

37. The method according to the claim 33, wherein the M powder is the powder prepared by a reduction method, the powder prepared by an electrolytic process or the powder prepared by a carbonyl process, and the particle size of the M powder is 500 nm to 10 μm.

* * * * *